Figure 6:
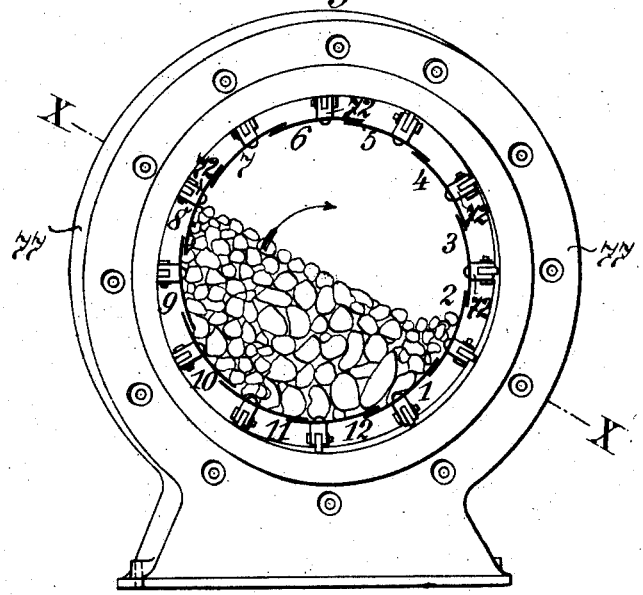

No. 882,976.
PATENTED MAR. 24, 1908.
A. SUESS.
TRANSPORTING APPARATUS.
APPLICATION FILED JAN. 14, 1907.
6 SHEETS—SHEET 1.
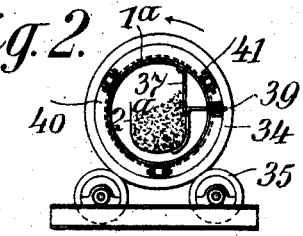
Fig. 2.
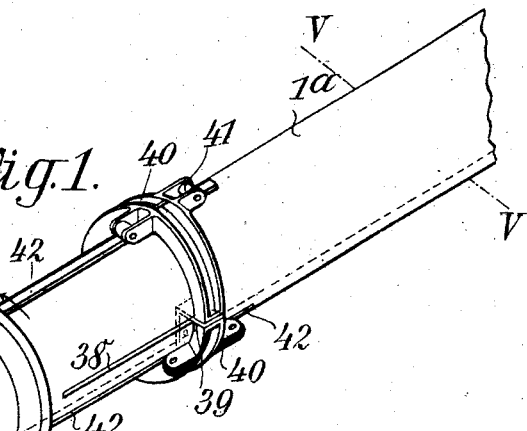
Fig. 1.
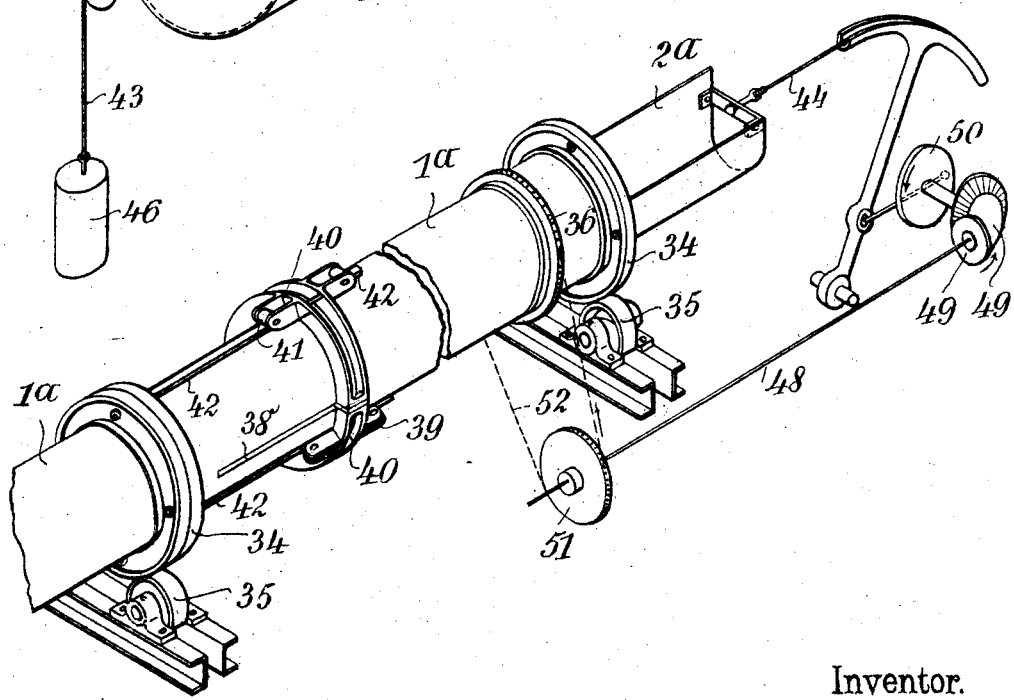
Fig. 2ª
Witnesses.
Jesse N. Lutton
B. Sommers
Inventor.
Adolf Suess
by Henry Orth Jr
Atty.

No. 882,976. PATENTED MAR. 24, 1908.
A. SUESS.
TRANSPORTING APPARATUS.
APPLICATION FILED JAN. 14, 1907.
6 SHEETS—SHEET 2.
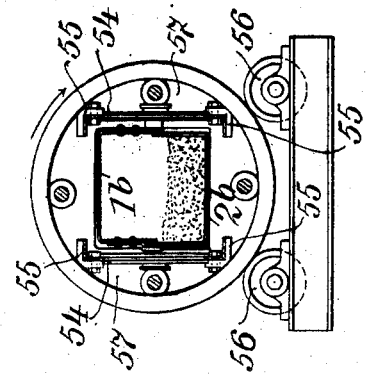
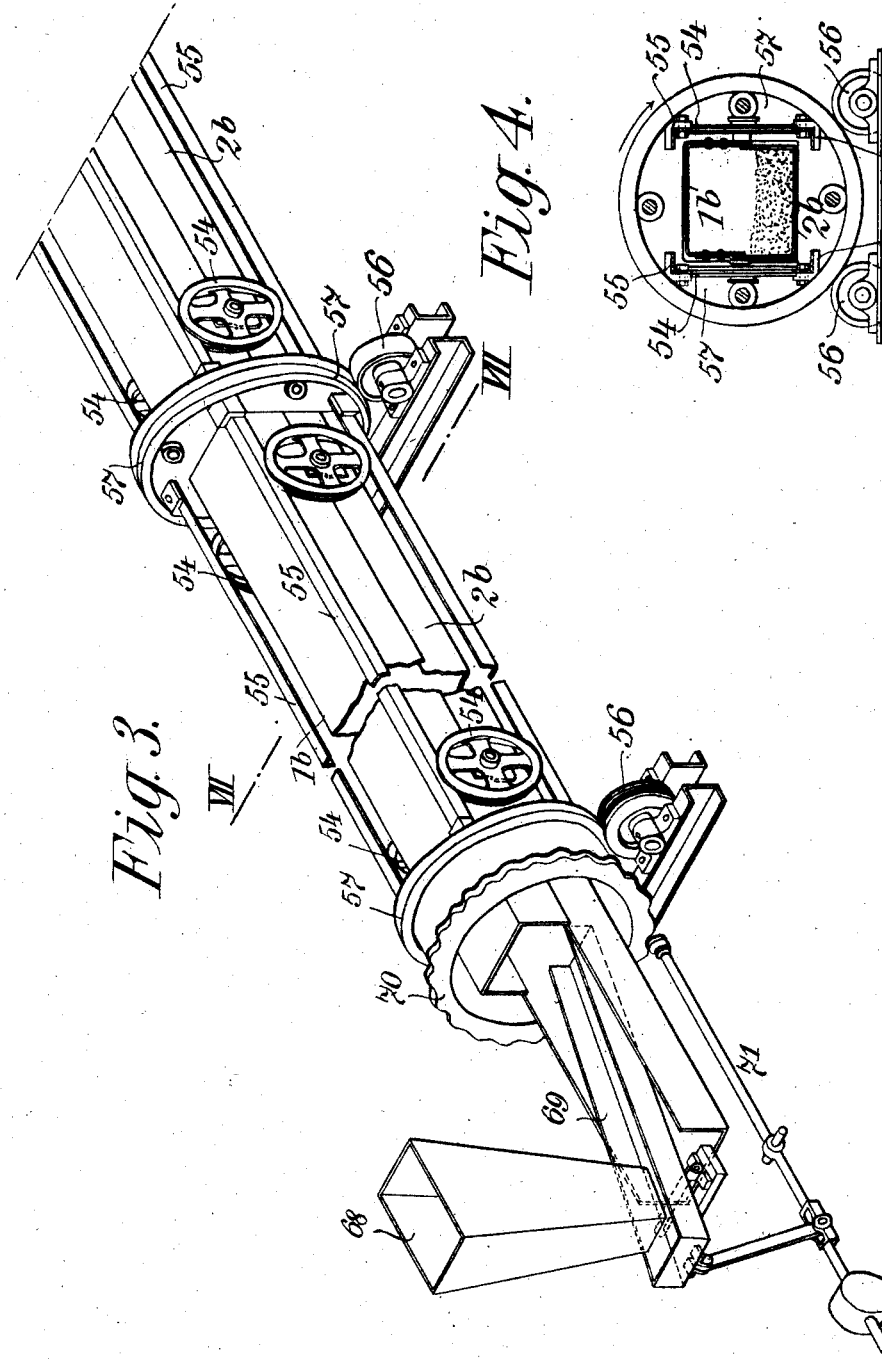
Witnesses.
Inventor.

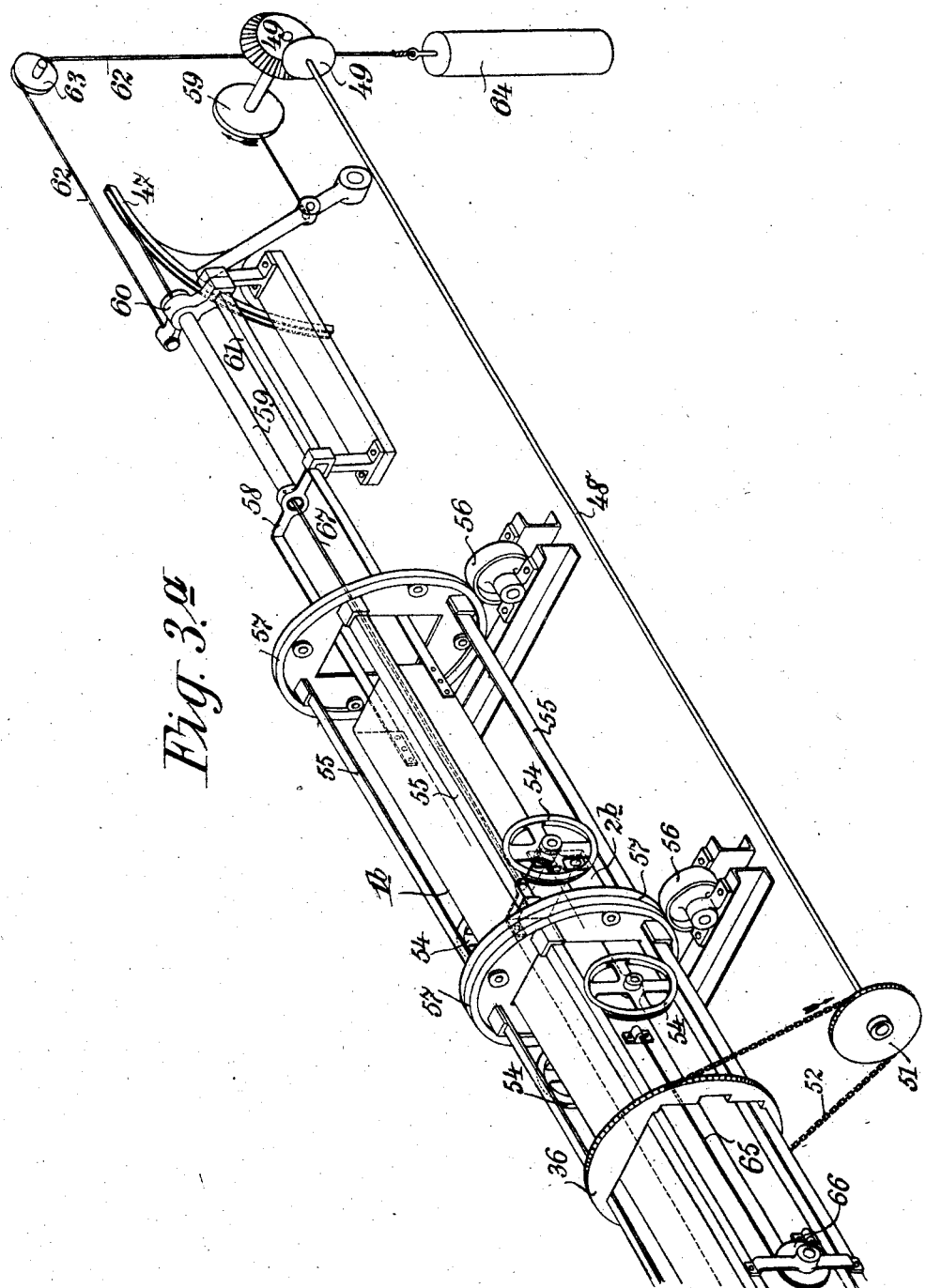

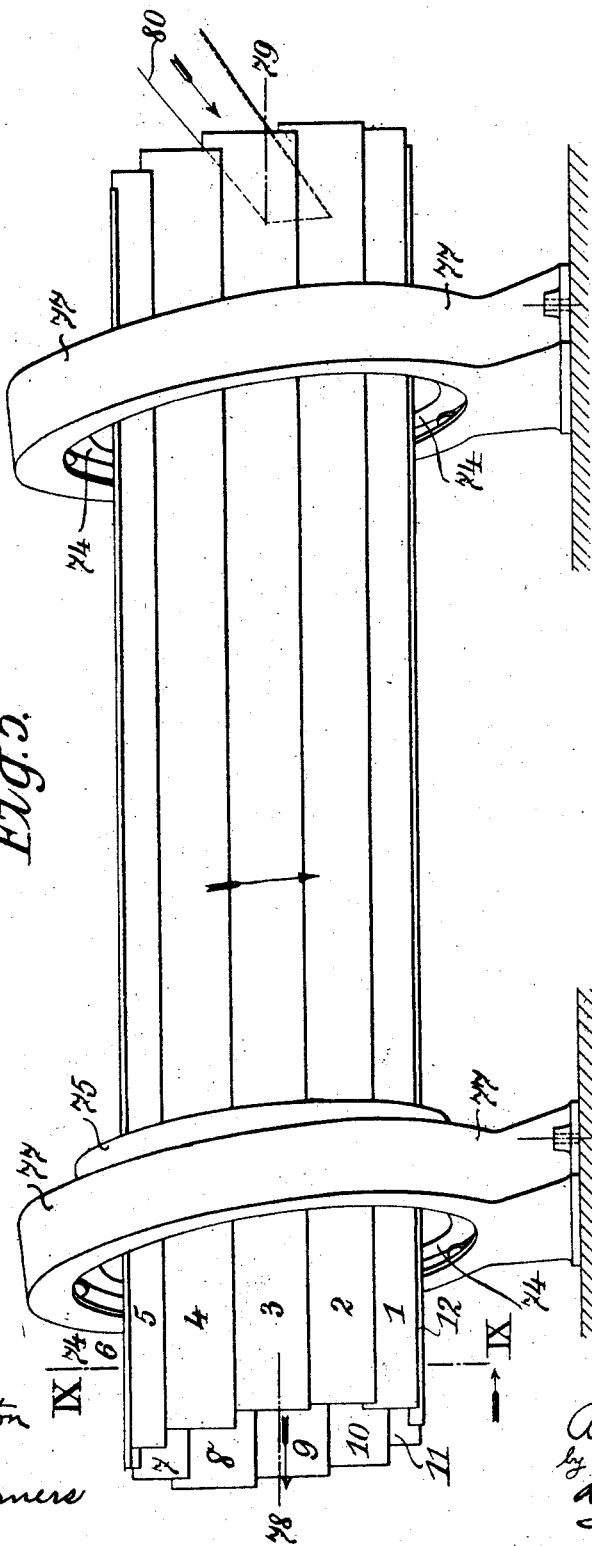

No. 882,976. PATENTED MAR. 24, 1908.
A. SUESS.
TRANSPORTING APPARATUS.
APPLICATION FILED JAN. 14, 1907.

6 SHEETS—SHEET 5.

Witnesses.
Jesse N. Sutton
B. Sommers

Inventor.
Adolf Suess
by Henry Ott Jr
Atty.

No. 882,976. PATENTED MAR. 24, 1908.
A. SUESS.
TRANSPORTING APPARATUS.
APPLICATION FILED JAN. 14, 1907.
6 SHEETS—SHEET 6.
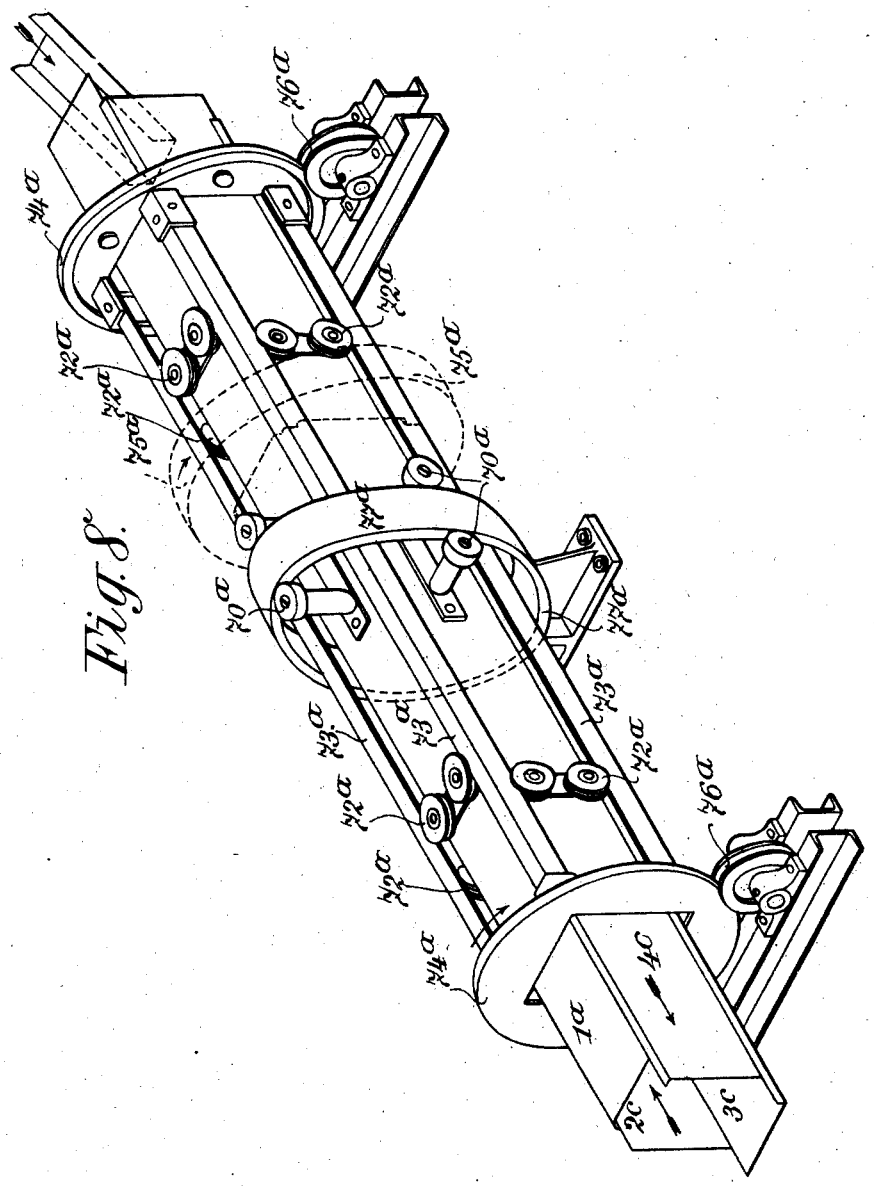
Witnesses. Inventor.

UNITED STATES PATENT OFFICE.

ADOLF SUESS, OF WITKOWITZ, AUSTRIA-HUNGARY.

TRANSPORTING APPARATUS.

No. 882,976.

Specification of Letters Patent.

Patented March 24, 1908.

Application filed January 14, 1907. Serial No. 352,238.

*To all whom it may concern:*

Be it known that I, ADOLF SUESS, a subject of the Emperor of Austria-Hungary, residing at Witkowitz, in Moravia, Austria-Hungary, have invented certain new and useful Improvements in Transporting Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to transporting apparatus suitable for materials which are of mealy, gritty, or granular character, or in particles, such as flour, grain, cement, sand, pebbles, ores, stones of various sizes, clay, slag, coal, coke etc.

The apparatus consists substantially of transporting elements arranged parallel to each other and formed of straight strips, gutters or tubes, extending from the receiving end of the apparatus to the delivery end thereof. These elements are, for a fractional part of the entire course, over which the material is to be transported, capable of being moved parallel to each other and are adapted to be rotated to alternately receive the material, feed it forward and reciprocally so deliver it onwardly that it passes continually to the outlet.

Transporting apparatus embodying the features above described may be constructed in various ways to transport in a horizontal or inclined direction according to the nature of the material to be transported and according to the various local conditions.

For horizontal or gently ascending transportation the transporting elements may have smooth bearing or carrying surfaces. In the case of steeper transportation transverse partitions may be employed to prevent the material slipping back.

The number of transporting elements varies according to the constructional form, said elements may all be movable in the direction of transportation or individual elements may stand still in relation to the direction of transportation and only effect the transference of the material onto the moving transporting elements.

The transference of the material to be transported from element to element is effected by rotation of the elements about a common axis.

The accompanying drawings show, by way of example, various constructional forms of transporting apparatus constructed according to this invention.

Figure 7:
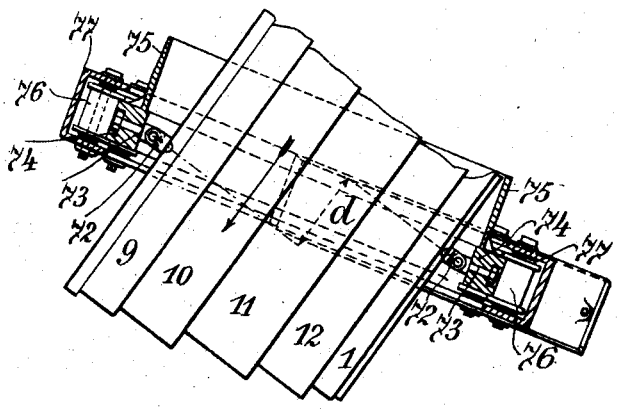

Figure 1 is a perspective view illustrating the receiving end of a horizontal transporting apparatus having two elements of which one is constructed as a carrier tube and only effects the transference of the material, while the other consists of a movable longitudinal gutter situated in this tube and effects the advance of the material to be transported. Fig. 2 is a transverse section corresponding to the line V—V of Fig. 1. Fig. 2$^a$ is a perspective view of the discharge end of the apparatus illustrated in Fig. 1. Figs. 3 and 3$^a$ together show a perspective, and Fig. 4 in transverse section corresponding to the line VII—VII of Fig. 3, a construction of horizontal transporting apparatus with two transporting elements consisting of gutters and in which transference of the material is effected by rotation of the gutters about common imaginary axes. Fig. 5 is a side view showing a horizontal transporting apparatus having twelve plate-like transporting elements arranged in cylindrical form, the transference of the material to be transported being effected by rotation of the transporting elements about a common imaginary axis. Figs. 6 and 7 are sections corresponding to the lines IX—IX of Fig. 5, and X—X of Fig. 6 respectively, and Fig. 8 is a perspective view of a transporting apparatus consisting of four plate-like transporting elements which move axially and rotate about an imaginary common axis.

The construction shown in Figs. 1 and 2 comprises two transporting elements, one of which is in the form of a rotary tube 1$^a$ and the other in the form of a gutter 2$^a$ axially movable in the tube 1$^a$ and rotating therewith. The tube is provided with supporting rings 34 resting rotatably upon rollers 35 and is further provided with a sprocket wheel 36 and an internal conveying wall 37 (see Fig. 2). Longitudinal slots 38 are formed in the tube through which extend stirrups 39 that carry the gutter 2$^a$. These stirrups are attached to rings 40 which embrace the tube 1$^a$ externally and by means of rollers 41 said rings are guided upon flat iron ways 42 on the tube 1ª. Centrally to the axis of the tube the gutter 2ª is rotatably connected at both ends to cords 43, 44 of which cord 43 is passed over a roller 45 and kept taut by a weight 46 while the cord 44 is attached to a sector piece 47 adapted to be oscillated by a crank 50 actuated by means of a pair of bevel wheels 49 and a counter shaft 48. The driving shaft 48 also carries a chain wheel 51 which is connected by a chain 52 with the chain ring 36.

The left hand end of the tube 1ª is formed as a lading drum which receives the material to be transported from a filling reservoir 53 and allows it to fall into the gutter 2ª.

By means of the shaft 48 and the chain and crank driving mechanism the tube 1ª and the gutter 2ª are set in rotation, and the gutter 2ª at the same time is drawn once backward and forward at each revolution of the tube. During this movement the gutter 2ª passes into the lading drum, which delivers the material received from the filling reservoir 53 during its rotation, into the gutter immediately the open side of such gutter is turned upward. During the filling the advance of the gutter takes place and during its rotation the material is emptied out onto the inner surface of the tube 1ª where it passes, during the further rotation, along the conveying wall 37 again into the gutter which in the meantime has returned empty into the first half of the tube, after which the forward movement begins again during the filling operation. By repeating this operation the material to be transported, while situated alternately on the inner surface of the tube and its conveying wall and in the gutter, passes to that end of the gutter freely protruding from the tube and whence it is shot out.

In the construction shown in Figs. 3, 3ª and 4, the transporting elements consist of two gutters 1ᵇ and 2ᵇ having their open sides turned towards one another and moving reciprocally and rotating about a common imaginary axis. These gutters are guided by rollers 54 which rest upon angle bars 55 that also form connecting means between clutch disks 57 rotating upon rollers 56. To the gutter 1ᵇ is attached a stirrup 58 to which is fixed a tube 59 upon which is loosely mounted a sleeve 60 having two arms and which bears against a collar on the end of the tube 59. Of these arms one slides upon a guide rod 61 while the other has connected to it a cord 62 which passes over a roller 63 and carries a weight 64, that tends to continually draw the gutter 1ᵇ towards the right. To this gutter is also attached one end of a cord 65 which is passed over a roller 66, mounted through a bridge piece on the angle bars 55, and is secured at its other end to the gutter 2ᵇ. To the gutter 2ᵇ is attached centrally to the carrier disks 57 a cord 67 which passes through the tube 59 and is secured to a sector piece 47 adapted to be driven, as in the construction shown in Fig. 1, by means of a crank drive 50 and bevel gear 49 from a counter shaft 48, which by means of the chain drive 36, 52 and 51 also effects the rotation of the gutters 1ᵇ and 2ᵇ.

Arranged at the left hand end of the transporting apparatus is a filling hopper 68 which delivers the material to be transported into a supply gutter 69 arranged to be shaken by a device 71 which receives its motion from a corrugated ring 70 connected to one of the carrier disks 57.

By rotation of the counter shaft 48 both transporting elements 1ᵇ and 2ᵇ are rotated about a common imaginary axis and are alternately drawn backwardly and forwardly at each rotation, the supply gutter 69 being simultaneously shaken.

The material to be transported is passed through the supply gutter 69 and on the rotation of the gutter 1ᵇ and 2ᵇ into that gutter which is for the time being at the bottom and which also advances while the upper empty one goes back. The exit of the material to be transported takes place at the free advancing ends of the gutters or through flaps or openings arranged therein in any desired manner.

The driving apparatus shown in Figs. 1 and 3, 3ª might also be arranged to work intermittently by the use of elliptical disks, for example, shifting of belts, or the like, so that the rotation of the gutters would take place during the periods of rest of their axial movement and the axial movement of the gutters take place without simultaneous rotation.

The transporting device shown in Figs. 5, 6 and 7 comprises a greater number, for example twelve, cylindrically arranged transporting elements consisting of longitudinally arranged plates 1 to 12, which are hung by hinge pins 72 and rotary bolts 73 from the inside of two or more circular rings 74 one of which is formed in one piece with a belt pulley 75. These rings are each mounted upon a comparatively large number of rollers 76 arranged in a circular row and provided with guide flanges, the spindles of these rollers being carried in a common casing 77 formed as a carrying standard with bearing or base plates. The running rings 74 together with their bearing or base plates are arranged parallel to each other but are set obliquely to the axis 78, 79, and in such a way that that portion of the transport apparatus upon which the center of the bearing surface of the material to be transported by the rotation of the plates 1 to 12 is situated projects in relation to the other portions.

In Fig. 6 the middle of the bearing surface lies upon the element 11. The several transporting elements for the purpose of avoiding jammings overlap each other stepwise, intermediate spaces being left. If the belt pulley 75 of the running ring 74 be rotated this rotation is transmitted through the bolts and hinge connection to all the transporting elements 1 to 12 and to the other running rings. The transporting elements consequently not only revolve about the imaginary axis 78, 79 but also oscillate successively during each rotation, in the direction of transportation along the path $d^1$, Fig. 7, once backwardly and forwardly, the forward movement taking place when the elements are loaded and the rearward movement when they are free of material to be transported. The inner space bounded by the transporting elements can be about half filled with material to be transported and in consequence of the operation described the material will only be caused to lie upon those transporting elements which are in forward movement and thus will be compelled to move forward in a desired direction. The supply takes place through an ordinary feed gutter 80 and the delivery by flowing out at the other end of the transporting apparatus or through flaps or openings at any desired point.

On constructional considerations there may be placed between the running rings light connected rings also connected to the transporting elements by hinges and bolts but which will not run on roller bearings.

In the case of transportation in a more upward direction, or for the purpose of increasing the capacity, transverse partitions certain distances apart may be applied to the transporting elements.

If necessary the inside of the transporting elements may be lined with fireproof materials.

The longitudinal movements of the transporting elements may also be attained in another way. For example there may be arranged, as shown in Fig. 8, vertically to four transporting elements $1^c$ to $4^c$ and vertically to their axis of rotation, running rings $74^a$ mounted upon rollers $76^a$ and which are connected to each other by four bars $73^a$ along which the elements are guided in their axial movements by means of rollers $72^a$ while thrust rollers $70^a$, which are attached to the elements run on the ends of the fixed loop $77^a$ which embraces the transporting apparatus obliquely to the axis of rotation. The driving may for example be by means of a belt pulley $75^a$ arranged concentrically to the axis at any desired point on the rails $73^a$.

From the foregoing it will be seen that transporting apparatus according to this invention and embodying the features set forth at the commencement of the specification may be constructed in the most varied ways and such apparatus possesses the advantage of great simplicity and great capacity with little wear of the moving parts and small consumption of power.

I claim:—

1. A transporting apparatus comprising a plurality of conveying members extending from the receiving to the delivery end of the apparatus, means to relatively displace the members longitudinally and means to revolve said members simultaneously around a common axis.

2. A transporting apparatus, comprising a plurality of conveying members extending from the receiving to the delivery end of the apparatus, means to alternately displace the members longitudinally and means to revolve said members simultaneously around a common axis.

3. In a transporting apparatus, the combination of a plurality of conveying members extending from the receiving to the delivery end of the apparatus, rotatable supports for the conveying members and means to relatively displace said members longitudinally.

4. A transporting apparatus comprising a plurality of conveying members forming a rectangular trough extending from the receiving to the delivery end of the apparatus, rotatable supports for said members, and means to alternately displace each member longitudinally.

5. A transporting apparatus comprising a plurality of conveying members mounted at right angles to each other, circular rotatable supports for said member, a displacing member, and controlling members on the conveying members in contact with the displacing member.

6. A transporting apparatus comprising a plurality of straight conveying members extending from the receiving to the delivery end of the apparatus, mounted at right angles to each other, disks supporting the conveying members, rollers supporting the disks, a ring surrounding the conveying members obliquely to their axis of rotation, and thrust rollers on the conveying members in contact with the ring.

7. A transporting apparatus comprising a plurality of circular supports, angle-irons connecting the latter, a plurality of straight conveying-members mounted in the supports at right-angles to each other, guide rollers journaled on the conveying-members embracing the angle-irons, a stationary ring surrounding the conveying members obliquely to their axis of rotation, thrust-rollers mounted on said conveying members in contact with the ring, and a drive pulley fixed on the angle-irons.

In testimony that I claim the foregoing as my invention, I have signed my name in presence of two subscribing witnesses.

ADOLF SUESS.

Witnesses:
JOSEF RUBASCH,
ALVESTO S. HOGUE.